United States Patent
Boksem et al.

(10) Patent No.: US 11,927,550 B2
(45) Date of Patent: Mar. 12, 2024

(54) SAMPLE MOUNTING SYSTEM FOR AN X-RAY ANALYSIS APPARATUS

(71) Applicant: Malvern Panalytical B.V., Almelo (NL)

(72) Inventors: Jaap Boksem, Almelo (NL); Detlef Beckers, Almelo (NL)

(73) Assignee: MALVERN PANALYTICAL B.V., Almelo (NL)

( * ) Notice: Subject to any disclaimer, the term of this patent is extended or adjusted under 35 U.S.C. 154(b) by 6 days.

(21) Appl. No.: 17/547,479

(22) Filed: Dec. 10, 2021

(65) Prior Publication Data

US 2022/0187224 A1 Jun. 16, 2022

(30) Foreign Application Priority Data

Dec. 11, 2020 (EP) .................................... 20213623

(51) Int. Cl.
  *G01N 23/20025* (2018.01)
  *G01N 23/207* (2018.01)
  *G01N 23/2204* (2018.01)

(52) U.S. Cl.
  CPC ..... *G01N 23/20025* (2013.01); *G01N 23/207* (2013.01); *G01N 23/2204* (2013.01); *G01N 2223/03* (2013.01); *G01N 2223/056* (2013.01); *G01N 2223/076* (2013.01); *G01N 2223/1016* (2013.01); *G01N 2223/307* (2013.01); *G01N 2223/309* (2013.01); *G01N 2223/419* (2013.01)

(58) Field of Classification Search
  None
  See application file for complete search history.

(56) References Cited

U.S. PATENT DOCUMENTS

| | | | | |
|---|---|---|---|---|
| 3,973,120 A | * | 8/1976 | Kessels | G01N 23/20025 378/80 |
| 4,587,666 A | * | 5/1986 | Torrisi | G01N 23/2204 378/45 |
| 5,001,351 A | * | 3/1991 | Boksem | G02B 7/004 250/442.11 |
| 5,043,144 A | * | 8/1991 | Gordon | B01L 9/50 422/561 |
| 7,873,143 B2 | * | 1/2011 | Dunham | G01N 23/2204 378/46 |

(Continued)

FOREIGN PATENT DOCUMENTS

WO 2020186310 A1 9/2020

OTHER PUBLICATIONS

Extended European Search Report for corresponding European application No. 20213623.0, dated May 18, 2021. 8 pages.

*Primary Examiner* — Thomas R Artman
(74) *Attorney, Agent, or Firm* — Leason Ellis LLP

(57) ABSTRACT

The sample mounting system comprises a sample holder and a sample stage having a platform for supporting the sample holder. The sample can be fixed to the sample holder by a mount. The sample holder comprises a holder reference portion, which co-operates with a corresponding reference portion of the sample stage (the stage reference portion) to align the sample holder with the sample stage. When the sample holder is positioned on the platform such that the stage reference portion and the holder reference portion engage each other, the sample holder is aligned with the sample stage.

14 Claims, 8 Drawing Sheets

(56) References Cited

U.S. PATENT DOCUMENTS

| | | | | |
|---|---|---|---|---|
| 8,624,199 B2* | 1/2014 | Barrett | H01J 37/16 |
| | | | 250/442.11 |
| 9,087,673 B2* | 7/2015 | Barrett | H01J 37/20 |
| 10,468,230 B2* | 11/2019 | Lavely | H01J 37/256 |
| 10,535,495 B2* | 1/2020 | Willis | H01J 37/20 |
| 11,358,149 B2* | 6/2022 | Purdy | G01N 33/4833 |
| 11,525,790 B2* | 12/2022 | Ito | G01N 23/20025 |
| 2005/0060868 A1* | 3/2005 | McMurtry | A61C 13/0004 |
| | | | 29/559 |
| 2009/0045349 A1* | 2/2009 | Sprinzak | G01N 23/2204 |
| | | | 250/441.11 |
| 2009/0141862 A1* | 6/2009 | Dunham | G01N 23/2204 |
| | | | 378/208 |
| 2013/0105677 A1* | 5/2013 | Barrett | H01J 37/20 |
| | | | 250/252.1 |
| 2014/0191125 A1 | 7/2014 | Barrett et al. |
| 2019/0311877 A1* | 10/2019 | Willis | H01J 37/28 |
| 2019/0311881 A1* | 10/2019 | Lavely | H01J 37/28 |
| 2020/0061622 A1 | 2/2020 | Purdy et al. |
| 2021/0048398 A1* | 2/2021 | Ito | G01N 23/20025 |
| 2021/0102874 A1* | 4/2021 | Xue | G01N 1/36 |
| 2022/0187224 A1* | 6/2022 | Boksem | G01N 23/2204 |

\* cited by examiner

SAMPLE MOUNTING SYSTEM FOR AN X-RAY ANALYSIS APPARATUS

FIELD OF THE INVENTION

The present invention relates to the field of analysing material samples by X-ray analysis, for example by X-ray diffraction analysis, X-ray fluorescence analysis, X-ray computed tomography or X-ray scattering analysis. More specifically, the invention relates to a sample mounting system for use in an X-ray analysis apparatus, an X-ray analysis apparatus comprising the sample mounting system, and a method of using the sample mounting system.

BACKGROUND OF THE INVENTION

In the field of materials science, X-ray analysis can be used to characterise material samples. X-ray analysis apparatuses typically include an X-ray source, a sample stage and an X-ray detector. The X-ray source is arranged to irradiate the sample, and the X-ray detector is arranged to detect X-rays emitted or scattered by the sample. During this analysis, the sample is held or contained in a sample holder placed in the X-ray analysis apparatus.

The samples are analysed by measuring the magnitude and/or position of X-ray intensity peaks measured by the X-ray detector. In order to obtain reliable results, it is important that the X-ray analysis apparatus is properly aligned. For example, when analysing a sample by X-ray diffraction analysis carried out in reflection geometry, diffraction peak position is sensitive to the height of the sample surface. If the sample is displaced from the center of the goniometer, the diffracted X-rays are received by the X-ray detector at a position corresponding to a different 2θ angle. Accordingly, the diffraction peaks appear to be shifted, potentially leading to errors in the characterisation of the sample.

In some cases, it is desirable to carry out X-ray analysis by comparing the result of a sample to the results obtained using a reference standard/reference standards. Similarly, in this type of analysis, it is desirable for the sample to be reliably placed in a repeatable manner.

It would be desirable to reduce/avoid potential errors associated with misplacement of the sample. It would also be desirable to facilitate minimal operator input.

SUMMARY OF THE INVENTION

In an aspect of the invention, there is provided a sample mounting system for an X-ray analysis apparatus, the sample mounting system comprising:
  a sample holder comprising a mount for fixing the sample on an upper surface of the sample holder, the sample holder further comprising a holder reference portion; and
  a sample stage comprising a platform for supporting the sample holder, the sample stage comprising a stage reference portion for co-operating with the holder reference portion to locate the sample holder on the platform, wherein the sample holder and the sample stage have an aligned configuration, in which the sample holder is positioned on the platform such that the stage reference portion and the holder reference portion engage each other.

The sample stage and the sample holder are aligned when the sample holder is positioned on the platform such that the stage reference portion and the holder reference portion are engaged. Providing an arrangement in which the sample holder and sample stage engage when they are in the aligned configuration facilitates repeatable placement of the sample holder on the sample stage.

When the sample holder and the sample stage are not aligned, the holder reference portion and the stage reference portion are not able to engage each other, thereby assisting in preventing inaccurately aligned measurements and analysis being undertaken.

When the stage reference portion is engaged/mated with the holder reference portion, the orientation of the sample holder may be fixed. Alternatively, the sample holder may be free to change its orientation.

The stage reference portion and holder reference portion can assist a user in locating the correct position (locus and/or orientation) for the sample holder on the platform.

The holder reference portion(s) may be provided on any surface of the sample holder, e.g. the upper surface (i.e. the surface on which the sample is mounted) and/or the base (the surface opposite the upper surface) and/or at least one side surface of the sample holder. Likewise, the stage reference portion(s) may be provided in any location suitable for engaging with the holder reference portions to align the sample holder. For example, when the holder reference portions are provided on the base of the sample holder, the stage reference portions may be arranged under the sample holder (on the same side of the sample holder as the base) rather than above the sample holder.

The sample holder may have a central axis and the stage reference portion and the holder reference portion may be configured such that, in the aligned configuration, the engagement of the stage reference portion and the holder reference portion retains the sample holder and limits and/or prevents rotation of the sample holder about its central axis. In some embodiments, when the stage reference portion is engaged/mated with the holder reference portion, the sample holder may rotate about its central axis, such that the orientation of the sample holder is adjustable. In some other embodiments, the orientation of the sample holder with respect to the platform may be limited or fixed. For example, the engagement of the stage reference portion and the holder reference portion may limit of prevent rotation of the sample holder about its central axis.

The mount may be configured to fix a sample container for containing the sample to the sample holder. The mount may be a mechanism for attaching a sample container, such as a capillary, onto the sample holder. Alternatively, the mount may be a body for retaining the sample on the sample holder, or a cavity in the sample holder. For example, the sample could be held in a cavity of the sample holder, or on a plate (e.g. for XRF analysis, or XRD analysis in reflection geometry), or contained between two foils (e.g. for X-ray analysis in transmission geometry). The particular container used will depend, in part, on the type of X-ray analysis measurement to be carried out and the type of sample to be analysed.

In some embodiments, either the holder reference portion is a projection and the stage reference portion is a recess for receiving the projection, or the stage reference portion is a projection and the holder reference portion is a recess for receiving the projection.

The recess may be of any shape suitable for receiving the projection. In some embodiments, the recess may be a notch or a groove (i.e. it may be elongate). The groove may be linear or it may be curved. In a preferred embodiment, the recess and the projection may have inclined walls.

In some embodiments, the sample holder has a central axis, and the sample stage may comprise:
a base comprising the platform; and
a reference assembly comprising the stage reference portion, wherein the reference assembly is arranged to face the platform and, in the aligned configuration, the stage reference portion engages the holder reference portion.

The sample mounting system may comprise a rotation mechanism for rotating the sample holder about its central axis. The rotation mechanism may allow an operator to adjust the orientation of the sample holder. That is, when the stage reference portion and the holder reference portion are shaped such that the sample holder is free to rotate about its central axis when the stage reference portion and the holder reference portion are engaged, the sample holder is free to rotate about its central axis whilst the sample holder and the sample stage are in the aligned configuration. Accordingly, the rotation mechanism can allow the operator to adjust the orientation of the sample holder, whilst the sample holder and the sample stage are in the aligned configuration.

The holder reference portion and/or the stage reference portion may comprise inclined walls.

The inclined walls may assist the reference portions to align, so that the reference portions are "self-aligning". For example, when the stage reference portion and the holder reference portion are brought towards one another, the inclined walls can assist in locating the aligned configuration.

The stage reference portion may comprise a bearing attached to the reference assembly and the holder reference portion may comprise a notch, in a surface of the sample holder, for receiving the bearing.

The reference assembly may not be arranged above the sample holder. In that case, the notch may not be in an upper surface of the sample holder. It may instead be in another surface of the sample holder (for example in the base of the sample holder).

The shape of the notch may be different to the shape of the bearing, as long as the notch is capable of receiving the bearing. The bearing may be a roller bearing, or a ball bearing.

When either the holder reference portion or the stage reference portion comprises a recess (i.e. for receiving a corresponding projection on the respective stage reference portion or the holder reference portion), the recess may comprise inclined walls.

The walls of the recess may be inclined at an angle of less than 80 degrees, for example between 20 degrees and 60 degrees. The angle between the inclined walls may be an obtuse angle. The recess may accordingly form a tapered cavity, since the width of the recess decreases with depth. When the recess is a notch, the walls may incline with respect to a base of the notch. When the recess is a groove, the first and second sidewall may meet at an apex at the bottom of the groove, such that the groove appears triangular in cross section.

The recess may comprise curved walls.

The sample holder may comprise a plurality of holder reference portions and the sample stage may comprise a plurality of corresponding stage reference portions. The quantity of holder reference portions and stage reference portions need not necessarily be equal.

The sample mounting system may comprise multiple pairs of respective reference portions (i.e. multiple pairs of a holder reference portion and a stage reference portion).

The sample holder may further comprise:
a body having a peripheral edge; and
a holder alignment part,
wherein the holder alignment part is either a recess extending inwardly from the peripheral edge or a projection extending outwardly from the peripheral edge.

The holder alignment part may visually assist a user with manual pre-positioning of the sample holder, thereby ensuring adequate alignment of the sample holder and sample stage so that the stage reference portion and the holder reference portion engage each other and correctly position the sample for analysis. The holder alignment part may also assist a user in aligning the sample holder with a sample changer, for loading the sample onto the platform.

The sample mounting system may further comprise:
a sample changer for loading the sample holder onto the sample stage, the sample changer comprising a changer alignment part, wherein the holder alignment part and the changer alignment part are configured to engage each other when the sample holder is in an aligned orientation with the sample changer.

The holder alignment part may be a projection and the changer alignment part may be a recess for receiving the projection, or vice versa.

In an aspect of the invention, there is provided a method of mounting a sample to a sample mounting system as described above, the method comprising:
placing the sample holder on the platform;
moving the sample holder towards the stage reference portion to bring the stage reference portion and the holder reference portion into contact; and
applying a force to the stage reference portion via the holder reference portion to cause the sample holder to move to the aligned configuration.

The method may further comprise:
aligning the orientation of the sample holder with the sample changer, such that the sample holder is in an aligned orientation, by positioning the sample holder so that the position of the holder alignment part corresponds to the position of the changer alignment part;
inserting the sample holder into the sample changer, with the sample holder in the aligned orientation; and
loading the sample holder onto the platform.

The sample changer may be an automatic sample changer, and the method may further comprise pre-aligning the sample changer with the sample stage, such that, when the sample holder is inserted into the sample changer in the aligned orientation, the sample changer loads the sample holder onto the platform in a position corresponding to the aligned configuration.

The holder alignment part may be a flange and the changer alignment part may be a recess for receiving the flange, and inserting the sample holder into the sample changer in the aligned orientation may comprise inserting the flange into the recess.

BRIEF DESCRIPTION OF THE DRAWINGS

Embodiments of the present invention will now be described, by way of example, with reference to the accompanying drawings, in which:

FIG. 2A shows the holder reference 15 being circular.

FIG. 2B shows the sample holder 1 comprising multiple recesses, each of which is a circular segment. FIG. 2C shows the sample holder 1 having two holder reference portions 15 of different shapes;

FIG. 3A shows a wedge-shaped projection 13, together with a V-shaped recess 15. FIG. 3B shows a projection 13 having a rounded tip, together with a groove 15 having a curved base. FIG. 3C shows another example of a recess 15 that is defined between two inclined walls;

Figure 1:
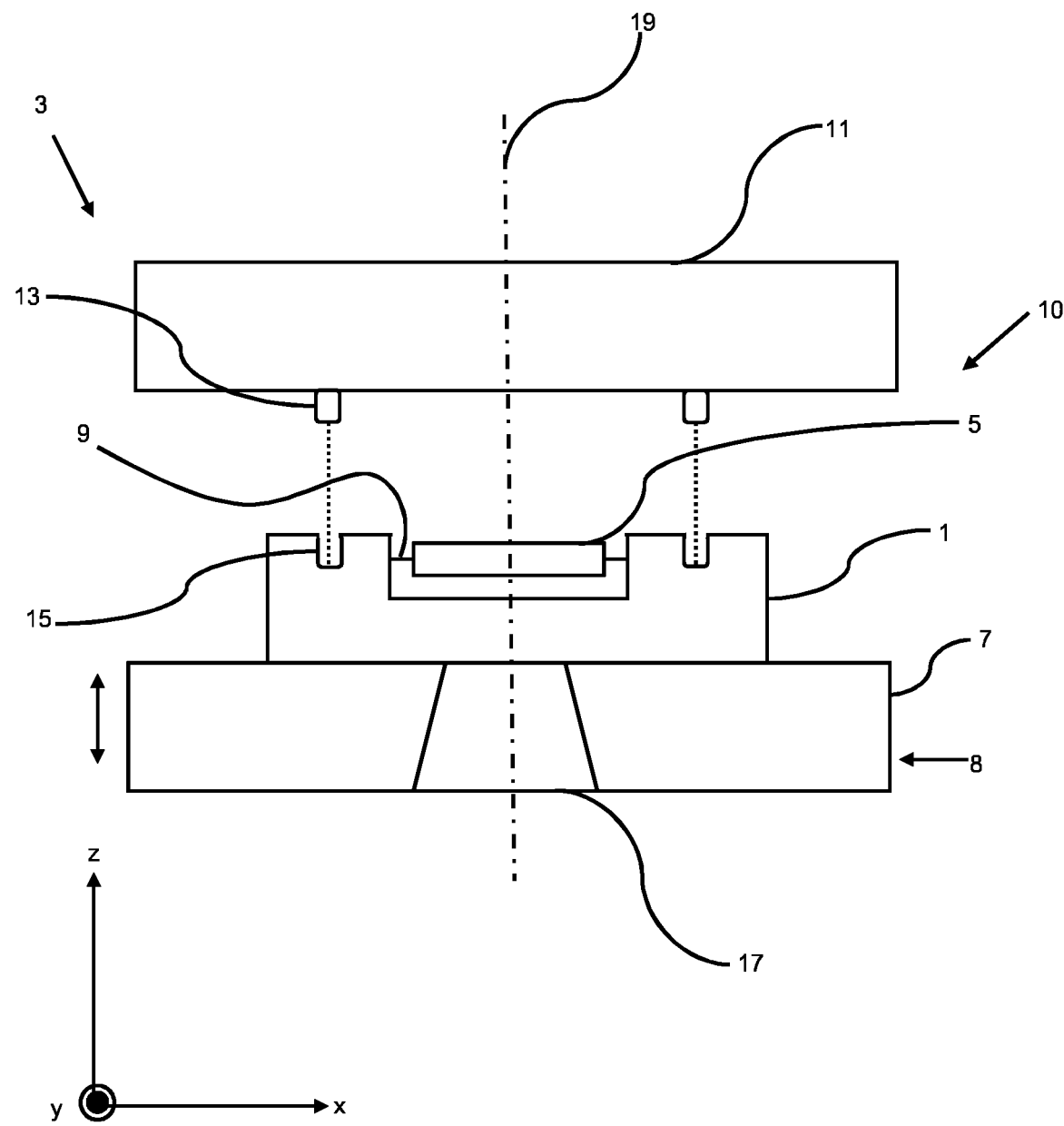
FIG. 1 shows a schematic diagram, in cross section, of a sample mounting system for an X-ray analysis apparatus, according to an embodiment of the invention.

It should be noted that these figures are diagrammatic and not drawn to scale. Relative dimensions and proportions of parts of these figures have been shown exaggerated or reduced in size, for the sake of clarity and convenience in the drawings.

DETAILED DESCRIPTION

Typically, X-ray analysis apparatuses include an X-ray source, an X-ray detector and a sample support. They may also include a goniometer, for determining the angular position of the X-ray detector and/or X-ray source. FIG. 1 shows a schematic diagram of a sample mounting system 10 for an X-ray analysis apparatus, according to an embodiment of the invention The sample mounting system 10 comprises a sample holder 1 and a sample stage 3 having a platform 7 for supporting the sample holder 1. In this embodiment, the sample is contained in a capillary 5, which is fixed to sample holder by a mount 9 on the upper surface of the sample holder 1. The sample stage 3 also includes a base 8 and a reference assembly 11 that is arranged above the base 8, such that the upper surface of the sample holder 1 faces the reference assembly 11. The sample stage 3 further comprises a rotation mechanism 17, which is integrated into the base 8. The rotation mechanism 17 is configured to rotate the sample holder 1 about its central Z-axis 19, when the sample holder is on the platform 7. The rotation mechanism might also be configured to rotate the capillary along its central, longitudinal axis (the X- direction in FIG. 1).

The height of the platform 7 can be adjusted, as illustrated by the arrows, to change the position of the sample relative to the reference assembly 11 (i.e. to change the position of the sample along the Z-axis). This can help to enable a user to conveniently replace the sample holder 1, for example when replacing the sample. When the sample mounting system 10 is used in an X-ray apparatus including a goniometer, the sample mounting system 10 is positioned at the center of the goniometer circle. The reference assembly 11 is then fixed in position, and provides a convenient reference point to refer to when adjusting the position of platform 7 and/or the sample holder 1 along the Z-axis.

The inventors have realised that, in addition to aligning the sample holder 1 along the Z-axis, it is useful to be able to locate and/or orientate the sample holder 1 in other directions. That is, it is useful to be able to position the sample holder 1 in a plane perpendicular to the height direction (i.e. along the X-direction and/or Y-direction) in a convenient and repeatable manner. As well as locating the sample holder 1 in the X-Y plane a repeatable manner, it can also be useful to orientate the sample holder 1 in a repeatable manner (i.e. to reduce/avoid rotation of the sample about the central Z-axis, with respect to a reference orientation).

Displacement of the sample holder (and therefore the sample) in a direction along the incident beam path can lead to an apparent shift in the position of measured diffraction peaks. Referring to FIG. 1, displacement along the beam path is displacement in the Y-direction or, where the incident beam path is in the X-Y plane, displacement along the beam path is displacement in the direction along the component of the incident beam path in the Y-direction. The apparent shift refers to the change in position of the diffraction peaks measured if the same sample is analysed, in subsequent measurements, wherein the sample is displaced between the two measurements. That is, if a sample is first analysed in an initial position, then displaced along the Y-axis and analysed again in a displaced position, the diffraction peaks obtained in the displaced position will appear shifted compared to the diffraction results obtained with the sample holder 1 in the original position. Additionally, the amount by which the peak is shifted as a result of the displacement varies with the diffraction angle. Displacement of the sample by only tens of micrometers (e.g. 100 µm) can give rise to peak shift. Since the diffraction peak positions are used to identify the components/crystalline phases present in a sample, shifting of peak positions can make it more difficult to accurately interpret the results of the diffraction analysis. This is generally relevant in any application where the measurement data is compared to a reference to identify components/crystalline phases present in the sample. For example, this may be relevant when diffraction analysis is conducted by comparing the results to a database of X-ray diffraction patterns, or when using reference standards. It is therefore desirable for the sample holder to be positioned on the platform in a repeatable manner.

This is not only relevant for X-ray analysis carried out in transmission geometry. For example, for X-ray diffraction analysis carried out in reflection mode, or for X-ray fluorescence (XRF) analysis of a sample, the location of the sample in the X-Y plane (e.g. in the plane of the illuminated surface of the sample) is important if it is desired to illuminate only part of the illuminated surface. For example, positioning in the plane of the illuminated surface (when the sample is mounted for reflection geometry or XRF analysis, the illuminated surface would be in the X-Y plane in FIG. 1) may be needed to ensure that only a certain specific part of the (inhomogeneous) sample is analysed.

Accurate, reproducible sample positioning may also be relevant when X-ray computed tomography (CT) measurements are performed. For CT measurement, typically the intensity transmitted through the sample is measured by a 2D detector. By measuring the intensity for many orientations of the sample (e.g. by rotating the sample around the z-axis) and using a reconstruction algorithm, the 3D morphological structure of the sample can be obtained. An accurate reproducible positioning of the sample is relevant especially when an analyst wants to correlate CT data with data from XRD or XRF measurements on parts of the sample. Similarly, accurate and reproducible positioning of the sample is also relevant when an analyst wants to correlate CT data with any other analysis on the same sample and the sample needs to be moved or remounted between the measurements, for example when several samples are measured in a batch with a sample changer. A reproducible mounting in the rotation plane is also needed, if several CT measurements have to be merged. This may be required, for example, if the sample is too large to allow a full analysis with a single CT scan.

Additionally, rotation of the sample in the X-Y plane can make it more difficult to accurately interpret XRD, CT and/or XRF analysis results. In XRD measurements carried out in transmission geometry, the sample can be arranged so that the illuminated surface is perpendicular to the incident X-ray beam. If the sample is rotated, one part of the sample may be positioned relatively closer to the X-ray detector as compared to its initial position and another part of the sample may be positioned relatively further away from the X-ray detector. This means that diffraction from one part of the sample is detected at a relatively high angle and diffraction from the other part of the sample is detected at a relatively low angle. Accordingly, the diffraction peaks measured when the sample is in the rotated orientation appear broader than those measured with the sample in the initial position. It is therefore desirable to be able to position the sample holder on the platform in the same orientation for each measurement.

In embodiments of the invention, the sample mounting system comprises a stage reference portion 13 and a holder reference portion 15, which are arranged to co-operate with each other when the sample holder and the reference assembly are aligned in the X-Y plane. In this way, the stage reference portion 13 and the holder reference portion 15 can assist a user in locating the correct position (locus and/or orientation) for the sample holder 1 on the platform 7. In FIG. 1, the sample stage 3 comprises two stage reference portions 13, each of which is a projection 13, and two corresponding holder reference portions 15. The holder reference portions 15 are recesses for receiving the stage reference portions 15. The projections 13 protrude towards the platform 7. When the sample holder 1 is positioned on the platform 7 with the projections 13 aligned with the recesses 15, the projections 13 can be mated with the recesses 15 by moving the platform towards the reference assembly 11 until a tip of the projection contacts the base of the recess. In this arrangement, the sample holder 1 is in an aligned configuration. Providing an arrangement in which the holder reference portion 15 and the reference assembly 11 can only be mated when the sample holder 1 is in a particular location relative to the reference assembly 11 can help the user to position the sample holder 1 in a repeatable manner. By assisting repeatable positioning of the sample, the sample mounting system 10 can help to achieve reliable X-ray analysis results.

In the embodiment illustrated in FIG. 1, the holder reference portions are provided on an upper surface of the sample holder, but they could instead be provided in a different location. Likewise, the stage reference portions need to be positioned above the sample holder, facing the upper surface of the sample holder in. For example, the holder reference portions could be provided on the base of the sample holder, and the stage reference portions could be arranged under the sample holder.

In the embodiment illustrated in FIG. 1, the projections and recesses are cuboid-shaped (they are shown as rectangular in cross section). However, other shapes could be used. FIG. 2 shows various alternatives for shape, in plane view, of the holder reference portion 15 in FIG. 1. Each of these recesses can be used with a sample holder having a projection with a corresponding shape. In each example, the sample holder or the reference assembly could comprise the recess and the other of the sample holder and the reference assembly could comprise the projection (or protrusion).

Figure 2A:
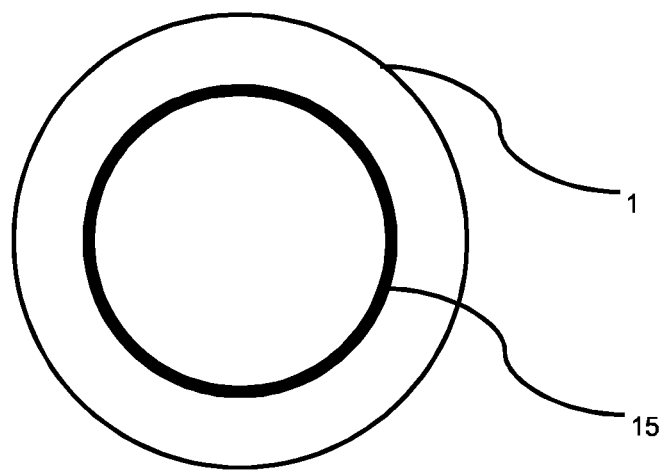
FIGS. 2A-2C show, in plan view, schematic diagrams of alternative sample holders for use in the embodiment of FIG. 1.

In FIG. 2A, the holder reference portion 15 is circular. When the recess is circular, once the sample holder 1 has been aligned with the reference assembly 11 in the X-Y plane, the projection 13 can engage with the recess 15 at any orientation. That is, the projection can engage with the reference assembly 11 even while the sample holder 1 is rotated about its central axis (i.e. even while the orientation of the sample holder is changed). The projection 13 might also be circular in shape, or it may be a segment of a circle. In any case, the projection 13 and recess 15 can only engage when the sample holder is positioned on the platform, in the X-Y plane, so as to be aligned with the reference assembly 11. In some embodiments, the reference assembly 11 may comprise multiple concentric circular projections or protrusions 13, and the sample holder may comprise multiple corresponding circular recesses 15 for receiving the projections or protrusions 13.

Figure 2B:
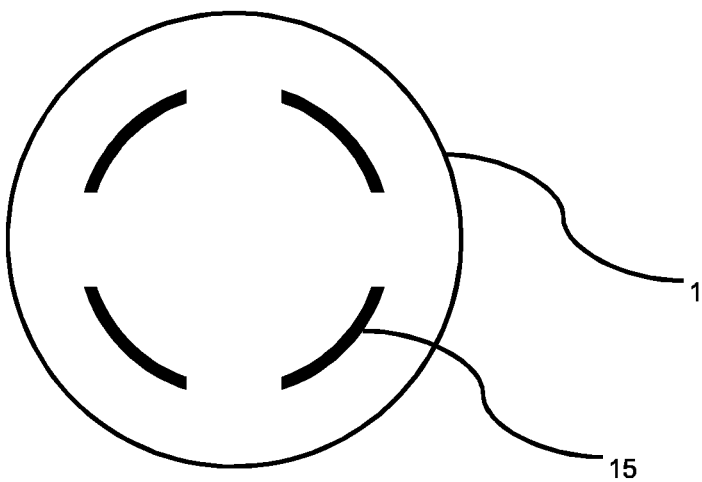

In FIG. 2B, the sample holder 1 comprises multiple recesses, each of which is a circular segment. Some examples of a projection (or projections) that could be used with this arrangement are a circular projection or a circular segment. The pattern could be circularly symmetric, so that the projection/s can engage with the reference assembly in multiple different sample holder orientations. In another example, the sample holder could comprise a circular segment recess and the reference assembly 11 could comprise a circular segment projection or protrusion that is smaller (i.e. the segment subtends a smaller angle). With this arrangement, the orientation of the sample holder in the aligned configuration may be limited.

Figure 2C:
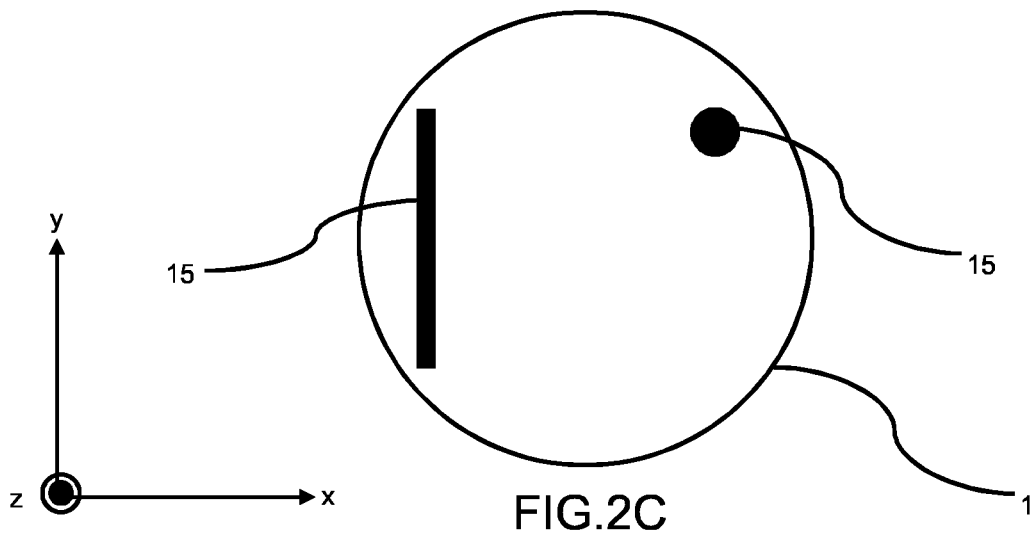

In FIG. 2C, the sample holder includes two holder reference portions having different shapes. The reference assembly could, for example, have a corresponding pattern. One of the holder reference portions is a linear projection, and the other is a round nub. With this arrangement, the sample holder and reference assembly can only engage when the sample holder is in one orientation, so that—in the aligned configuration—the orientation of the sample holder is restricted.

Figure 3A:
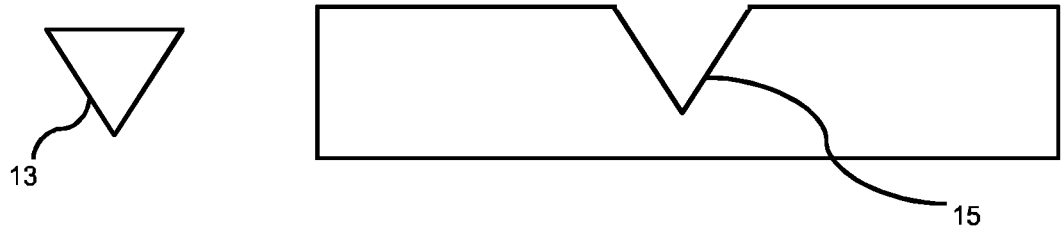
FIGS. 3A-3C show, in a cross-sectional view, schematic diagrams of various stage reference portions and holder reference portions for use in embodiments of the invention.
Figure 3B:
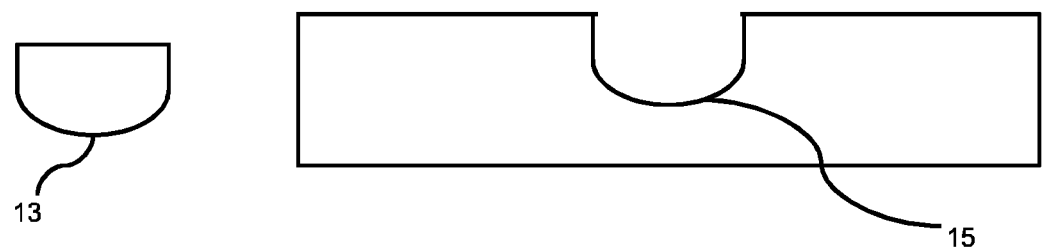
Figure 3C:
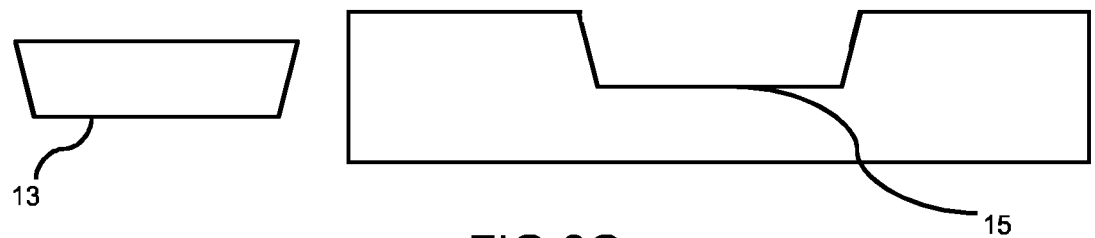

Although the stage reference portion and holder reference portion are shown in FIG. 1 to have a constant width, each may generally have a non-constant width and may have a tapered profile. FIG. 3 shows some example profiles for corresponding stage reference portions and holder reference portions, in cross section. FIG. 3A shows a wedge-shaped projection 13, together with a V-shaped recess 15. The V-shaped recess 15 is defined between two sidewalls, which meets at an apex at the base of the recess 15. The recess may be a groove (i.e. it may be elongate) or it may be a notch (the width of the groove may be larger than the length of the groove). The inclined walls can assist in locating the aligned configuration. In particular, when the recess and projection are pushed together, the inclined walls may help the sample holder to self-align with the stage reference portion/holder reference portion. FIG. 3B shows a projection 13 having a rounded tip, together with a groove 15 having a curved base. FIG. 3C shows another example of a recess 15 that is defined between two inclined walls.

Although FIG. 3 shows examples in which the holder reference portion and the stage reference portion have the same/similar (i.e. complementary) shapes, this is not required. The holder reference portion may have a different shape to the stage reference portion, as long as the reference portions contact each other at two opposing contact points.

Figure 4:
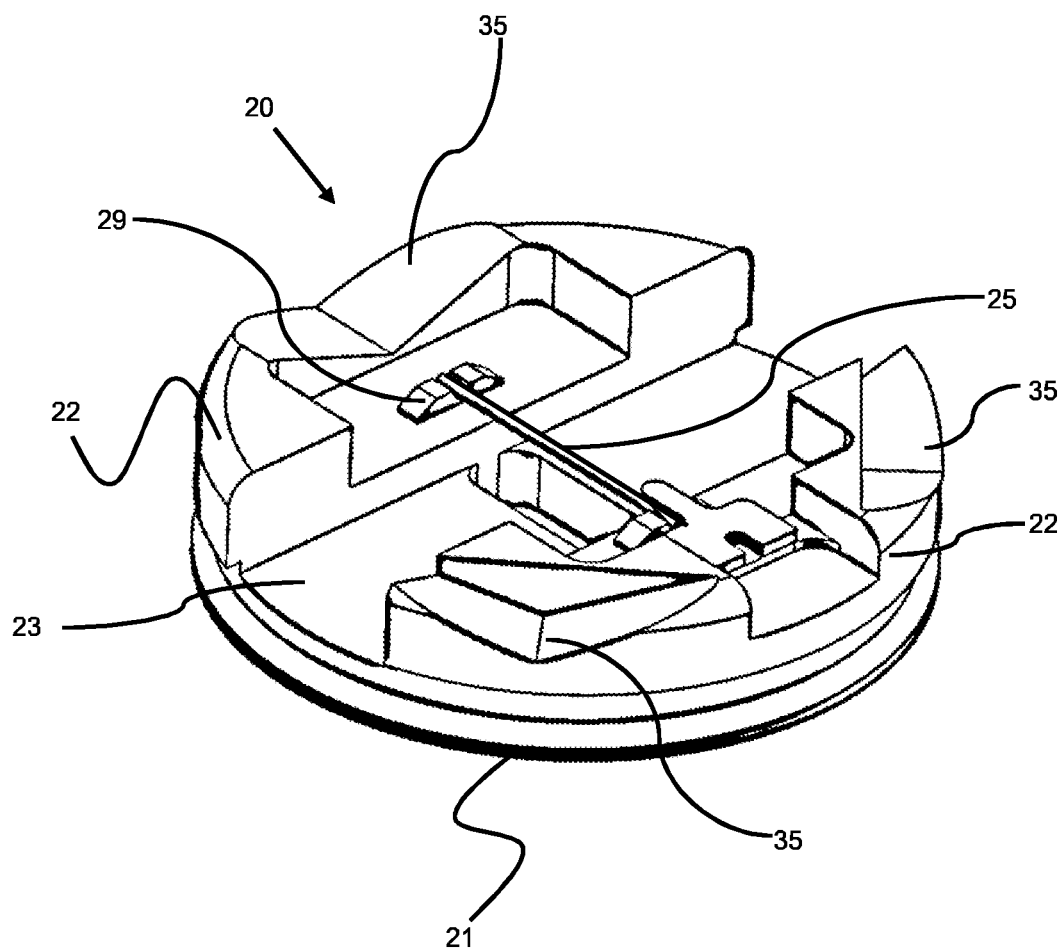
FIG. 4 shows, in a perspective view, a schematic diagram of a sample holder according to an embodiment of the invention.

FIG. 4 illustrates a sample holder 20 according to another embodiment. The sample holder has a circular base 21, and comprises two wall portions 22 protruding from an upper surface of the base 21. The two wall portions are opposed to one another, and define a channel 23 that runs diametrically across the base 21 of the sample holder 20. A mount 29 is arranged to hold the sample container 25, across the channel. The wall portions 22 comprise notches 35, which are arranged around the periphery of the sample holder 20. Each notch 35 has a base that extends in a radial direction. Each notch 35 is defined between two walls. The walls slope at an acute angle to a plane including the upper surface of the wall portion (e.g. about 45 degrees). The angle between the two walls may be an obtuse angle i.e. equal to or greater than 90 degrees. Providing notches with an inclined surface can assist a user in locating an aligned configuration. In an embodiment, the sample holder is used with a reference assembly comprising one or multiple wedge-shaped projection/s or protrusion/s corresponding to the three notches 35. Preferably, the reference assembly comprises three or fewer protrusions. In an alternative embodiment, the reference assembly comprises one or multiple corresponding bearings (e.g. roller bearings, or ball bearings).

Figure 5:
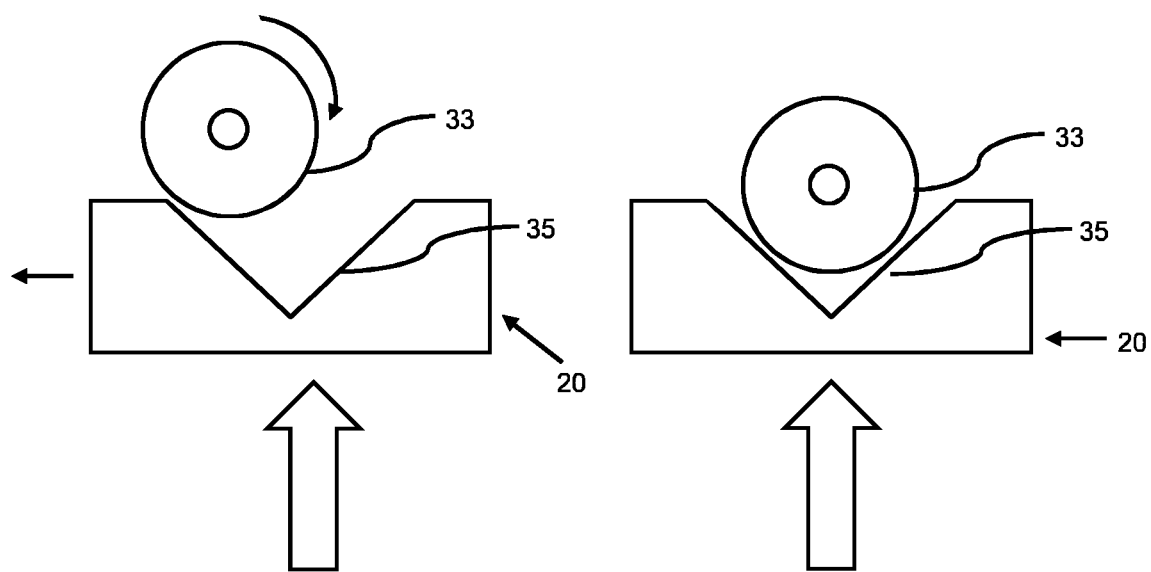
FIG. 5 illustrates the interaction between the holder reference portion and the stage reference portion in an embodiment of the invention.

FIG. 5 illustrates the interaction between the bearings 33 and notches 35, according to an embodiment of the invention. In order to load the sample holder 1, 20 onto the sample stage 3 for analysis by the X-ray analysis apparatus, the sample holder is placed on the platform. The operator may, depending on the X-ray analysis to be carried out, position the sample holder in an approximately appropriate orientation. That is, the operator may place the sample holder on the platform such that the positions of the notches 35 approximately (but not necessarily precisely) correspond to the positions of the bearings 33. The platform is then raised, to bring the sample holder 1, 20 towards the reference assembly. As the upper surface of the sample holder contacts the bearings 35, and the platform is moved towards the reference assembly, the bearings 35 rotate, and the resultant force pushes the sample holder into a position in which the notches receive the bearings (i.e. the sample holder moves to the aligned configuration). In this way, the sample holder and the reference assembly co-operate with each other to more finely align the sample holder with the reference assembly. This can avoid the need for an operator to spend time finely aligning the sample holder, so that X-ray analysis of the sample can be carried out in a more efficient way. Additionally, by facilitating alignment of the sample holder with the X-ray apparatus, the sample holder can be conveniently loaded without compromising the reliability of X-ray analysis results.

Figure 6:
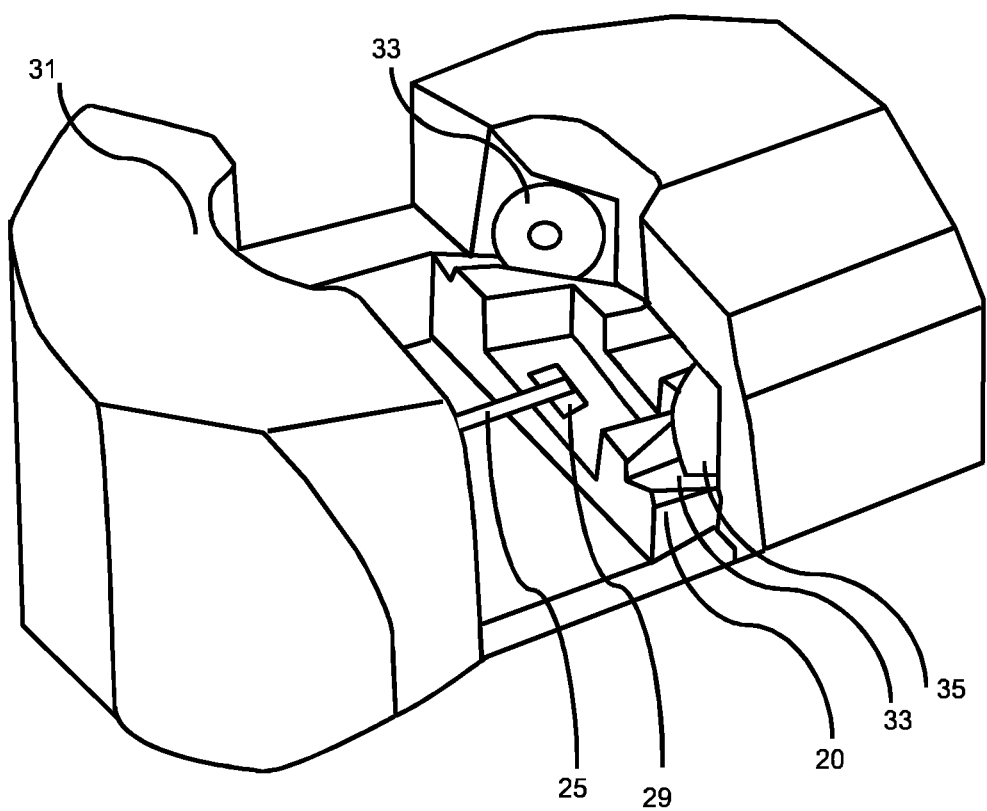
FIG. 6 shows, in perspective view, a schematic diagram of an embodiment including the sample holder of FIG. 4.

FIG. 6 shows the sample holder of FIG. 4, together with a corresponding reference assembly 31. The sample holder 20 is arranged on a platform (not shown), and can be rotated about its central axis by a rotation mechanism arranged beneath the platform. The reference assembly 31 comprises multiple stage reference portions 33, which are arranged to contact the upper surface of the sample holder 20. The stage reference portions 33 are bearings (e.g. roller bearings, or ball bearings). Each bearing has a cylindrical body that is rotatable about a fixed central axis. When the sample holder 20 and the reference assembly 31 are aligned, as shown in FIG. 6, the bearings are received in corresponding notches 35.

In some embodiments, the reference assembly 31 can be positioned such that when the bearings 33 are received in the notches 35, the sample container is arranged at the center of the goniometer. In this way, the bearings 33 can also provide a height reference for the sample.

In some embodiments, the sample holder can be removed or exchanged with another sample holder manually, by an operator. Alternatively, the X-ray apparatus may comprise an automatic sample changer for removing and replacing the sample holder on the sample stage. Using the sample changer can help to improve efficiency. However, conventional sample changers are not generally able to repeatably position the sample holder on the platform within the spatial tolerance needed to avoid potential analysis errors caused by sample displacement. Therefore, even when the sample holder is placed on the platform by an automated system, it is important to ensure that the sample holder and reference assembly are properly aligned. To ensure that the sample holder is appropriately oriented on the sample changer, to allow alignment of the reference assembly and the sample holder once the sample holder has been loaded onto the platform, the sample holder may be pre-aligned with the sample changer.

Figure 7:
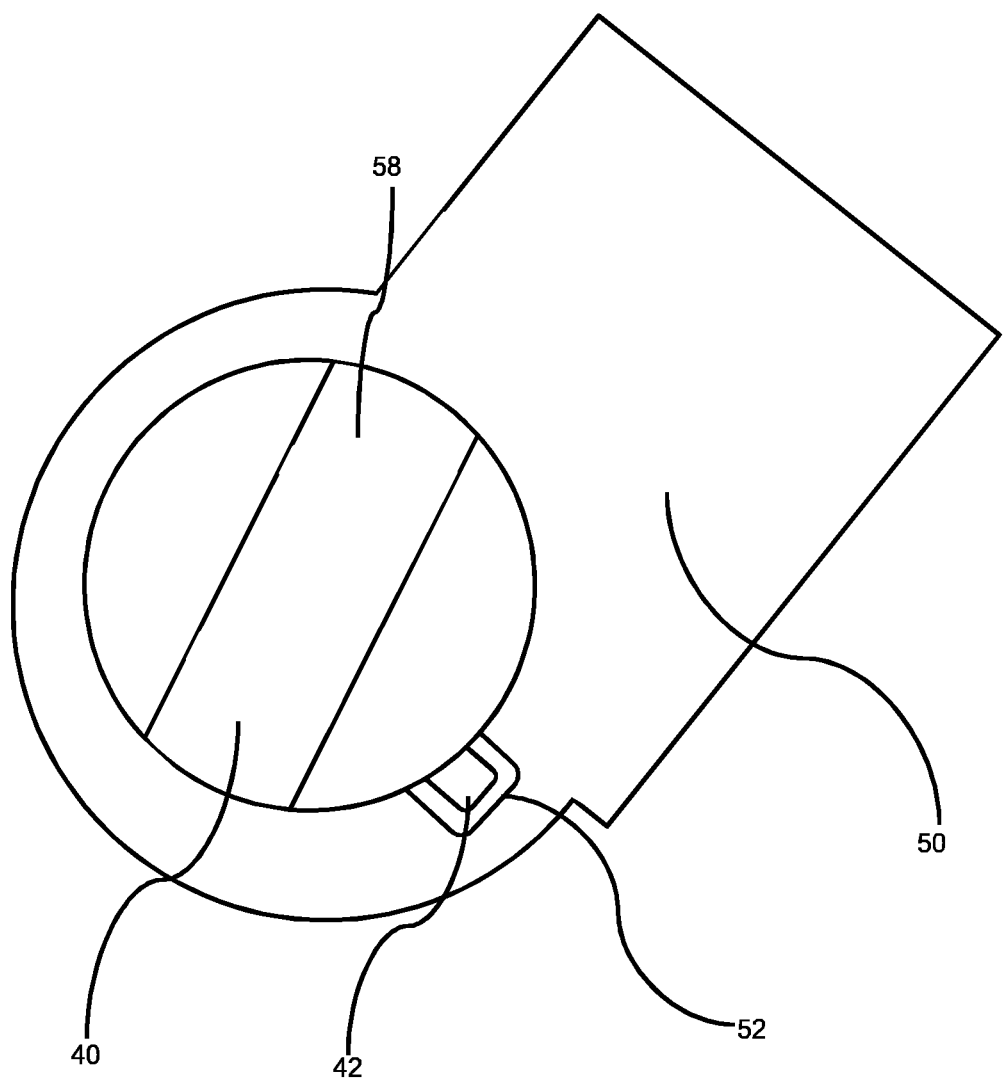
FIG. 7 shows, in plan view, a schematic diagram of a sample changer of a sample mounting system according to an embodiment of the invention.

FIG. 7 shows a sample changer 50 together with the sample holder 20 of FIG. 4. The sample holder 40 comprises a flange 42, which protrudes outwardly from the body 58 of the sample holder 20. The sample changer comprises a chamber for receiving the sample holder, and a recess 52 for receiving the flange 42. When the sample holder 40 is loaded onto the sample changer, it is positioned such that the recess 52 receives the flange. In this way, the operator can conveniently ensure that the sample holder 40 is in the appropriate orientation on the sample changer 50.

Figure 8:
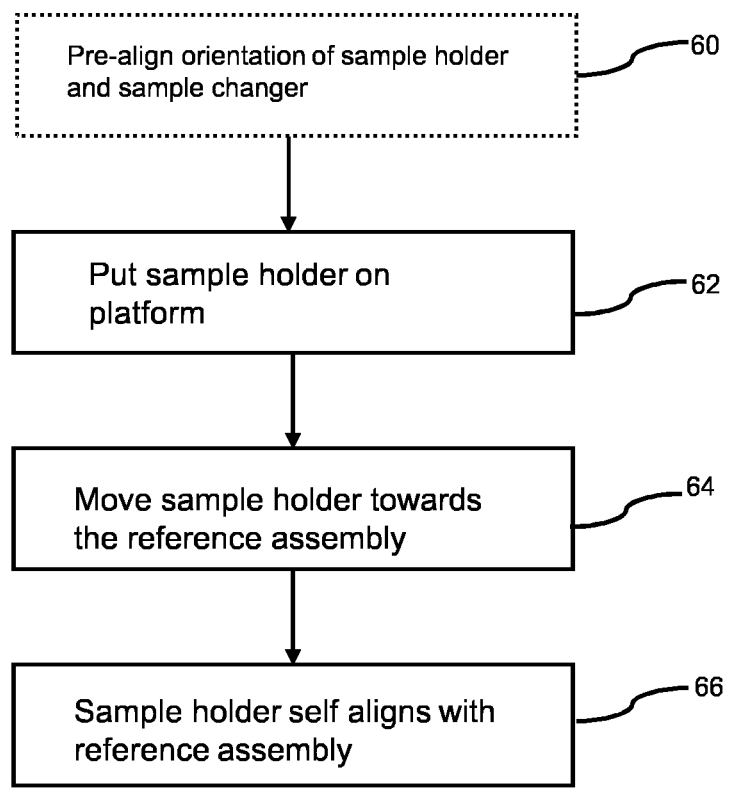
FIG. 8 illustrates a method of using a sample mounting system according to an embodiment of the invention.

FIG. 8 illustrates a method of using a sample mounting system according to an embodiment of the invention. The first step of the method shown in FIG. 8 is optional; the pre-alignment step 60 may be carried out if the sample mounting system includes a sample changer. If the sample mounting system does not include an automatic sample changer, this step is not included.

In the pre-alignment step 60, the sample holder is placed in the same changer and orientated so as to align with the sample changer. That is, the sample holder is oriented such that the holder alignment part engages with the changer alignment part.

Next, in the first loading step, the sample holder is placed on the platform of the sample stage. In some embodiments, the sample holder can be loaded manually. However, if the sample mounting system includes a sample changer, the sample changer may load the sample onto the platform automatically. The sample holder is loaded onto the platform such that it is approximately in an appropriate position and orientation. In a subsequent loading step 64, the platform is moved towards the reference assembly, to bring the stage reference portion towards the upper surface of the sample holder. In a further step 66, the stage reference portion and the sample holder are pressed together, causing the stage reference portion and holder reference portion to self-align (e.g. as shown in FIG. 5), and moving the sample holder into a configuration in which the stage reference portion and the holder reference portion engage with one another.

The skilled person understands that various modifications can be made to the embodiments described, whilst still within the scope of the invention.

In FIG. 1, the capillary is used to contain the sample. A capillary may be used to enable convenient analysis using, for example, X-ray diffraction analysis in transmission geometry. However, the sample loading system 10 can be used with other types of container. For example the sample could be held in a cavity of the sample holder, or on a plate (e.g. for XRF analysis, or XRD analysis in reflection geometry), or contained between two foils (e.g. for X-ray analysis in transmission geometry). The particular container used will depend, in part, on the type of X-ray analysis measurement to be carried out and the type of sample to be analysed.

The mount may be a mechanism for attaching a sample container, such as a capillary, onto the sample holder. Alternatively, the mount may be a body for retaining the sample on the sample holder, or a cavity in the sample holder.

The holder reference portion and the stage reference portion may or may not have the same shape (in a plan view and/or cross-sectional view).

The sample mounting system may comprise any number of pairs of stage reference portions and holder reference portions. For example, the embodiment described in connection with FIG. 4 may not have three pairs of stage reference portions and holder reference portions.

The stage reference portion is not necessarily a projection; it could instead be a recess. Likewise, the holder reference portion is not necessarily a recess; it could instead be a projection.

The holder alignment part is not necessarily a projection; it could instead be a recess. Likewise, the changer alignment part is not necessarily a recess; it could instead be a protrusion.

The sample holder may not be designed to hold a sample in a position suitable for X-ray diffraction in transmission geometry. It may instead be designed to hold the sample in a position suitable for other types of X-ray analysis, e.g. small spot X-ray fluorescence or X-ray diffraction in reflection geometry on inhomogeneous samples, X-ray computed tomography, or combinations of these techniques.

The sample stage may or may not include a rotation mechanism. When the sample mounting system (e.g. sample stage) comprises a rotation mechanism, the rotation mechanism may be motorised. The sample mounting system (e.g. sample stage) may not comprise a rotation mechanism. Rotation of the sample holder may not be required at all, or it may be carried out manually.

The recess may be a groove (i.e. it may be elongate) or a notch (i.e. it may not be elongate).

The recess and the projection may have the same shape, or they may have different shapes, as long as the pair can engage with each other.

The holder reference portion(s) is (are) not necessarily on an upper surface of the sample holder. It/they could instead be provided on the base of the sample holder or on the sides of the sample holder. Likewise, the stage reference portion (s) is (are) not necessarily on a reference assembly opposing the upper surface of the sample holder. They could be positioned anywhere on the stage as long as they can engage with the sample holder. For example, when the sample holder comprises a holder reference portion on its base, the stage reference portion(s) can be provided on the surface of the stage supporting the sample (i.e. on the platform).

The invention claimed is:

1. A sample mounting system for an X-ray analysis apparatus, the sample mounting system comprising:
   a sample holder comprising a mount for fixing the sample on an upper surface of the sample holder, the sample holder further comprising a holder reference portion; and
   a sample stage comprising a platform for supporting the sample holder, the sample stage comprising a stage reference portion for co-operating with the holder reference portion to locate the sample holder on the platform, wherein the sample holder and the sample stage have an aligned configuration, in which the sample holder is positioned on the platform such that the stage reference portion and the holder reference portion engage each other,
   wherein the sample holder has a central axis, and the sample stage comprises:
      a base comprising the platform, and
      a reference assembly comprising the stage reference portion,
      wherein the reference assembly is arranged to face the platform and, in the aligned configuration, the stage reference portion engages the holder reference portion,
      wherein the stage reference portion comprises a bearing attached to the reference assembly and the holder reference portion comprises a notch, in the upper surface of the sample holder, for receiving the bearing.

2. The sample mounting system of claim 1, wherein the sample holder has a central axis and the stage reference portion and the holder reference portion are configured such that, in the aligned configuration, the engagement of the stage reference portion and the holder reference portion retains the sample holder so as limit or prevent rotation of the sample holder about its central axis.

3. The sample mounting system of claim 1, wherein either:
   the holder reference portion is a projection and the stage reference portion is a recess for receiving the projection; or
   the stage reference portion is a projection and the holder reference portion is a recess for receiving the projection.

4. The sample mounting system of claim 3, wherein the recess comprises inclined walls.

5. The sample mounting system of claim 4, wherein the recess has curved sidewalls.

6. The sample mounting system of claim 1, wherein the holder reference portion and/or the stage reference portion comprises inclined walls.

7. The sample mounting system of claim 1, wherein the sample holder comprises a plurality of holder reference portions and the sample stage comprises a plurality of corresponding stage reference portions.

8. The sample mounting system of claim 1, wherein the sample holder further comprises:
   a body having a peripheral edge; and
   a holder alignment part,
   wherein the holder alignment part is either a recess extending inwardly from the peripheral edge or a projection extending outwardly from the peripheral edge.

9. The sample mounting system of claim 8, further comprising:
   a sample changer for loading the sample holder onto the sample stage, the sample changer comprising a changer alignment part, wherein the holder alignment part and the changer alignment part are configured to engage each other when the sample holder is in an aligned orientation with the sample changer.

10. The sample mounting system of claim 9 wherein the holder alignment part is a projection and the changer alignment part is a recess for receiving the projection.

11. A method of mounting a sample to a sample mounting system for an X-ray analysis apparatus, the sample mounting system comprising,
  a sample holder comprising a mount for fixing the sample on an upper surface of the sample holder, the sample holder further comprising a holder reference portion, and
  a sample stage comprising a platform for supporting the sample holder, the sample stage comprising a stage reference portion for co-operating with the holder reference portion to locate the sample holder on the platform, wherein the sample holder and the sample stage have an aligned configuration, in which the sample holder is positioned on the platform such that the stage reference portion and the holder reference portion engage each other,
  the method comprising:
  placing the sample holder on the platform;
  moving the sample holder towards the stage reference portion to bring the stage reference portion and the holder reference portion into contact; and
  applying a force to the stage reference portion via the holder reference portion to cause the sample holder to move to the aligned configuration.

12. The method of claim 11, wherein the sample the sample holder further comprises,
  a body having a peripheral edge, and
  a holder alignment part, wherein the holder alignment part is either a recess extending inwardly from the peripheral edge or a projection extending outwardly from the peripheral edge,
  wherein the sample mounting system further comprises a sample changer for loading the sample holder onto the sample stage, the sample changer comprising a changer alignment part, wherein the holder alignment part and the changer alignment part are configured to engage each other when the sample holder is in an aligned orientation with the sample changer,
  the method further comprising:
  aligning the orientation of the sample holder with the sample changer, such that the sample holder is in an aligned orientation, by positioning the sample holder so that the position of the holder alignment part corresponds to the position of the changer alignment part;
  inserting the sample holder into the sample changer, with the sample holder in the aligned orientation; and
  loading the sample holder onto the platform.

13. The method of claim 12 wherein the holder alignment part is a flange and the changer alignment part is a recess for receiving the flange, and inserting the sample holder into the sample changer in the aligned orientation comprises inserting the flange into the recess.

14. A sample mounting system for an X-ray analysis apparatus, the sample mounting system comprising:
  a sample holder comprising a mount for fixing the sample on an upper surface of the sample holder, the sample holder further comprising a holder reference portion, a body having a peripheral edge, and a holder alignment part, wherein the holder alignment part is a projection extending outwardly from the peripheral edge;
  a sample stage comprising a platform for supporting the sample holder, the sample stage comprising a stage reference portion for co-operating with the holder reference portion to locate the sample holder on the platform, wherein the sample holder and the sample stage have an aligned configuration, in which the sample holder is positioned on the platform such that the stage reference portion and the holder reference portion engage each other; and
  a sample changer for loading the sample holder onto the sample stage, the sample changer comprising a changer alignment part, wherein the holder alignment part and the changer alignment part are configured to engage each other when the sample holder is in an aligned orientation with the sample changer, wherein the changer alignment part is a recess for receiving the projection.

* * * * *